(12) United States Patent
Jeong et al.

(10) Patent No.: US 12,514,886 B2
(45) Date of Patent: Jan. 6, 2026

(54) **COMPOSITION COMPRISING *LACTOBACILLUS REUTERI* ATG-F4 FOR PREVENTION OR TREATMENT OF MUSCULAR DISORDER**

(71) Applicant: ATOGEN CO., LTD, Daejeon (KR)

(72) Inventors: Do Yeun Jeong, Daejeon (KR); Bo Ram Beck, Daejeon (KR); Ji Hee Kang, Daejeon (KR); Yong Hyun Lee, Daejeon (KR); Gun Seok Park, Daejeon (KR); Sung Hoon Im, Daejeon (KR); Won Ho Song, Daejeon (KR)

(73) Assignee: ATOGEN CO., LTD, Daejeon (KR)

( * ) Notice: Subject to any disclaimer, the term of this patent is extended or adjusted under 35 U.S.C. 154(b) by 911 days.

(21) Appl. No.: 17/605,391

(22) PCT Filed: Dec. 13, 2019

(86) PCT No.: PCT/KR2019/017674
§ 371 (c)(1),
(2) Date: Oct. 21, 2021

(87) PCT Pub. No.: WO2021/020663
PCT Pub. Date: Feb. 4, 2021

(65) Prior Publication Data
US 2022/0211779 A1 Jul. 7, 2022

(30) Foreign Application Priority Data
Jul. 31, 2019 (KR) .......................... 10-2019-0093050

(51) Int. Cl.
| | | |
|---|---|---|
| *A61K 35/747* | (2015.01) | |
| *A23L 33/135* | (2016.01) | |
| *A61K 35/00* | (2006.01) | |
| *A61P 21/00* | (2006.01) | |
| *C12R 1/225* | (2006.01) | |

(52) U.S. Cl.
CPC ............ *A61K 35/747* (2013.01); *A61P 21/00* (2018.01); *C12R 2001/225* (2021.05)

(58) Field of Classification Search
CPC . A61K 35/747; A61K 2035/115; A61P 21/00; C12R 2001/225; A23L 33/135; A23V 2002/00; A23V 2200/316
See application file for complete search history.

(56) References Cited

U.S. PATENT DOCUMENTS

| | | | | |
|---|---|---|---|---|
| 11,318,178 B2* | 5/2022 | Beck | .......................... | A23L 2/52 |
| 2017/0368112 A1 | 12/2017 | Erdman | | |

FOREIGN PATENT DOCUMENTS

| | | |
|---|---|---|
| CN | 104244736 A | 12/2014 |
| CN | 113423814 A | 9/2021 |
| KR | 10-2005-0109928 A | 11/2005 |
| KR | 10-2013-0048946 A | 5/2013 |
| KR | 10-1800632 B1 | 12/2017 |
| KR | 101951919 B1 * | 2/2019 |
| KR | 10-2019-0038451 A | 4/2019 |
| KR | 10-1997060 B1 | 7/2019 |
| KR | 10-2049700 B1 | 11/2019 |
| WO | 2017/223364 A1 | 12/2017 |

OTHER PUBLICATIONS

NCBI Accession No. CP035790.1 (1 page, Feb. 17, 2019) (Year: 2019).*
Dargenio et al. (Medicina, 2021, 57:733) (Year: 2021).*
Machine Translation of KR101951919B1 (11 pages, 2025) (Year: 2025).*
Baskerville et al. (CNS Neurosci Ther, 2010, 16:e92) (Year: 2010).*
Communication dated Nov. 14, 2023 issued by the Chinese Patent Office in Chinese Application No. 201980095840.1.
Extended European Search Report issued Oct. 4, 2022 in European Application No. 19940083.9.
Bernard J. Varian, "Beneficial bacteria inhibit cachexia", Oncotarget, 2016, vol. 7, No. 11, p. 11803-11816 (14 pages total).
Bo Ram Beck et al., "Multidisciplinary and Comparative Investigations of Potential Psychobiotic Effects of Lactobacillus Strains Isolated From Newborns and Their Impact on Gut Microbiota and Ileal Transcriptome in a Healthy Murine Model", Frontiers in Cellular and Infection Microbiology, Jul. 2019, vol. 9, Article 269, pp. 1-12 (12 pages total).
Yi-Ming Chen et al., "Lactobacillus plantarum TWK10 Supplementation Improves Exercise Performance and Increases Muscle Mass in Mice", Nutrients, 2016, vol. 8, No. 205, pp. 1-15 (15 pages total).
Fraser L. Collins et al., "Beneficial effects of Lactobacillus reuteri 6475 on bone density in male mice is dependent on lymphocytes", Scientific Reports, 2019, vol. 9 (17 pages total).
Korean Office Action for corresponding KR 10-2019-0093050, dated Sep. 10, 2019.
Korean Notice of Allowance for corresponding KR 10-2019-0093050, dated Nov. 19, 2019.
International Search Report for PCT/KR2019/017674, dated May 1, 2020.

* cited by examiner

*Primary Examiner* — David Steadman
*Assistant Examiner* — Joseph R Spangler
(74) *Attorney, Agent, or Firm* — Sughrue Mion, PLLC

(57) ABSTRACT

The present invention relates to a composition for the prevention or treatment of sarcopenia, the composition including a *Lactobacillus reuteri* ATG-F4 strain. More specifically, the strain exhibits an effect of improving muscle rehabilitation and motor ability by increasing the muscle mass in skeletal muscles, thereby being suitably used as an ingredient for compositions for the prevention or treatment of sarcopenia or muscular atrophy.

3 Claims, 18 Drawing Sheets
Specification includes a Sequence Listing.

FIG. 8

TCAGGATGAACGCCGGCGGTGTGCCTAATACATGCAAGTCGTACGCACTGGCCCAACTGATTGATGGTGCTTGCAC
CTGATTGACGATGGATCACCAGTGAGTGGCGGACGGGTGAGTAACACGTAGGTAACCTGCCCCGGAGCGGGGGATA
ACATTTGGAAACAGATGCTAATACCGCATAACAACAAAAGCCGCATGGCTTTTGTTTGAAAGATGGCTTTGGCTAT
CACTCTGGGATGGACCTGCGGTGCATTAGCTAGTTGGTAAGGTAACGGCTTACCAAGGCGATGATGCATAGCCGAG
TTGAGAGACTGATCGGCCACAATGGAACTGAGACACGGTCCATACTCCTACGGGAGGCAGCAGTAGGGAATCTTCC
ACAATGGGCGCAAGCCTGATGGAGCAACACCGCGTGAGTGAAGAAGGGTTTCGGCTCGTAAAGCTCTGTTGTTGGA
GAAGAACGTGCGTGAGAGTAACTGTTCACGCAGTGACGGTATCCAACCAGAAAGTCACGGCTAACTACGTGCCAGC
AGCCGCGGTAATACGTAGGTGGCAAGCGTTATCCGGATTTATTGGGCGTAAAGCGAGCGCAGGCGGTTGCTTAGGT
CTGATGTGAAAGCCTTCGGCTTAACCGAAGAAGTGCATCGGAAACCGGGCGACTTGAGTGCAGAAGAGGACAGTGG
AACTCCATGTGTAGCGGTGGAATGCGTAGATATATGGAAGAACACCAGTGGCGAAGGCGGCTGTCTGGTCTGCAAC
TGACGCTGAGGCTCGAAAGCATGGGTAGCGAACAGGATTAGATACCCTGGTAGTCCATGCCGTAAACGATGAGTGC
TAGGTGTTGGAGGGTTTCCGCCCTTCAGTGCCGGAGCTAACGCATTAAGCACTCCGCCTGGGGAGTACGACCGCAA
GGTTGAAACTCAAAGGAATTGACGGGGGCCCGCACAAGCGGTGGAGCATGTGGTTTAATTCGAAGCTACGCGAAGA
ACCTTACCAGGTCTTGACATCTTGCGCTAACCTTAGAGATAAGGCGTTCCCTTCGGGGACGCAATGACAGGTGGTG
CATGGTCGTCGTCAGCTCGTGTCGTGAGATGTTGGGTTAAGTCCCGCAACGAGCGCAACCCTGTTACTAGTTGCC
AGCATTGAGTTGGGCACTCTAGTGAGACTGCCGGTGACAAACCGGAGGAAGGTGGGGACGACGTCAGATCATCATG
CCCCTTATGACCTGGGCTACACACGTGCTACAATGGACGGTACAACGAGTCGCAAACTCGCGAGAGTAAGCTAATC
TCTTAAAGCCGTTCTCAGTTCGGACTGTAGGCTGCAACTCGCCTACACGAAGTCGGAATCGCTAGTAATCGCGGAT
CAGCATGCCGCGGTGAATACGTTCCCGGGCCTTGTACACACCGCCCGTCACACCATGGGAGTTTGTAACGCCCAAA
GTCGGTGGCCTAACCTTTATGGAGGGAGCCGCCTAAGGCGGGACAGATGACTGGGGTGAAGTCGTAACAGGAAACC
CCG

FIG. 9

```
TGCAGTCGAACGAGTTCTCGTTGATGATCGGTGCTTGCACCGAGATTCAACATGGAACGAGTGGCGGACGGGTGAG
TAACACGTGGGTAACCTGCCCTTAAGTGGGGGATAACATTTGGAAACAGATGCTAATACCGCATAGATCCAAGAAC
CGCATGGTTCTTGGCTGAAAGATGGCGTAAGCTATCGCTTTTGGATGGACCCGCGGCGTATTAGCTAGTTGGTGAG
GTAATGGCTCACCAAGGCGATGATACGTAGCCGAACTGAGAGGTTGATCGGCCACATTGGGACTGAGACACGGCCC
AAACTCCTACGGGAGGCAGCAGTAGGGAATCTTCCACAATGGACGCAAGTCTGATGGAGCAACGCCGCGTGAGTGA
AGAAGGCTTTCGGGTCGTAAAACTCTGTTGTTGGAGAAGAATGGTCGGCAGAGTAACTGTTGTCGGCGTGACGGTA
TCCAACCAGAAAGCCACGGCTAACTACGTGCCAGCAGCCGCGGTAATACGTAGGTGGCAAGCGTTATCCGGATTTA
TTGGGCGTAAAGCGAGCGCAGGCGGTTTTTTAAGTCTGATGTGAAAGCCCTCGGCTTAACCGAGGAAGCGCATCGG
AAACTGGGAAACTTGAGTGCAGAAGAGGACAGTGGAACTCCATGTGTAGCGGTGAAATGCGTAGATATATGGAAGA
ACACCAGTGGCGAAGGCGGCTGTCTGGTCTGTAACTGACGCTGAGGCTCGAAAGCATGGGTAGCGAACAGGATTAG
ATACCCTGGTAGTCCATGCCGTAAACGATGAATGCTAGGTGTTGGAGGGTTTCCGCCCTTCAGTGCCGCAGCTAAC
GCATTAAGCATTCCGCCTGGGGAGTACGACCGCAAGGTTGAAACTCAAAGGAATTGACGGGGCCCGCACAAGCGG
TGGAGCATGTGGTTTAATTCGAAGCAACGCGAAGAACCTTACCAGGTCTTGACATCTTTTGATCACCTGAGAGATC
AGGTTTCCCCTTCGGGGGCAAAATGACAGGTGGTGCATGGTTGTCGTCAGCTCGTGTCGTGAGATGTTGGGTTAAG
TCCCGCAACGAGCGCAACCCTTATGACTAGTTGCCAGCATTTAGTTGGGCACTCTAGTAAGACTGCCGGTGACAAA
CCGGAGGAAGGTGGGGATGACGTCAAATCATCATGCCCCTTATGACCTGGGCTACACACGTGCTACAATGGATGGT
ACAACGAGTTGCGAGACCGCGAGGTCAAGCTAATCTCTTAAAGCCATTCTCAGTTCGGACTGTAGGCTGCAACTCG
CCTACACGAAGTCGGAATCGCTAGTAATCGCGGATCAGCACGCCGCGGTGAATACGTTCCCGGGCCTTGTACACAC
CGCCCGTCACACCATGAGAGTTTGTAACACCCGAAGCCGGTGGCGTAACCCTTTTAGGGAGCGAGCCGTCTA
```

FIG. 10

```
CAAGTCGTACGCACTGGCCCAACTGATTGATGGTGCTTGCACCTGATTGACGATGGATCACCAGTGAGTGGCGGAC
GGGTGAGTAACACGTAGGTAACCTGCCCCGGAGCGGGGGATAACATTTGGAAACAGATGCTAATACCGCATAACAA
CAAAAGCCACATGGCTTTTGTTTGAAAGATGGCTTTGGCTATCACTCTGGGATGGACCTGCGGTGCATTAGCTAGT
TGGTAAGGTAACGGCTTACCAAGGCGATGATGCATAGCCGAGTTGAGAGACTGATCGGCCACAATGGAACTGAGAC
ACGGTCCATACTCCTACGGGAGGCAGCAGTAGGGAATCTTCCACAATGGGCGCAAGCCTGATGGAGCAACACCGCG
TGAGTGAAGAAGGGTTTCGGCTCGTAAAGCTCTGTTGTTGGAGAAGAACGTGCGTGAGAGTAACTGTTCACGCAGT
GACGGTATCCAACCAGAAAGTCACGGCTAACTACGTGCCAGCAGCCGCGGTAATACGTAGGTGGCAAGCGTTATCC
GGATTTATTGGGCGTAAAGCGAGCGCAGGCGGTTGCTTAGGTCTGATGTGAAAGCTTTCGGCTTAACCGAAGAAGT
GCATCGGAAACCGGGCGACTTGAGTGCAGAAGAGGACAGTGGAACTCCATGTGTAGCGGTGGAATGCGTAGATATA
TGGAAGAACACCAGTGGCGAAGGCGGCTGTCTGGTCTGCAACTGACGCTGAGGCTCGAAAGCATGGGTAGCGAACA
GGATTAGATACCCTGGTAGTCCATGCCGTAAACGATGAGTGCTAGGTGTTGGAGGGTTTCCGCCCTTCAGTGCCGG
AGCTAACGCATTAAGCACTCCGCCTGGGGAGTACGACCGCAAGGTTGAAACTCAAAGGAATTGACGGGGGCCCGCA
CAAGCGGTGGAGCATGTGGTTTAATTCGAAGCTACGCGAAGAACCTTACCAGGTCTTGACATCTTGCGCTAACCTT
AGAGATAAGGCGTTCCCTTCGGGGACGCAATGACAGGTGGTGCATGGTCGTCGTCAGCTCGTGTCGTGAGATGTTG
GGTTAAGTCCCGCAACGAGCGCAACCCTTGTTACTAGTTGCCAGCATTAAGTTGGGCACTCTAGTGAGACTGCCGG
TGACAAACCGGAGGAAGGTGGGGACGACGTCAGATCATCATGCCCCTTATGACCTGGGCTACACACGTGCTACAAT
GGACGGTACAAGGCGCAAGCTCGCGAGAGTAAGCTAATCTCTTAAAGCCGTTCTCAGTTCGGACTGTAGGCTG
CAACTCGCCTACACGAAGTCGGAATCGCTAGTAATCGCGGATCAGCATGCCGCGGTGAATACGTTCCCGGGCCTTG
TACACACCGCCCGTCACACCATGGGAGTTTGTAACGCCCAAAGTCGGTGGCCTAACCTTTATGGAGGAGC
```

```
ATG-F3    GTACGACCGCAAGGTTGAAACTCAAAGGAATTGACGGGGGCCCGCACAAGCGGTGGAGCA    928
ATG-F4    GTACGACCGCAAGGTTGAAACTCAAAGGAATTGACGGGGGCCCGCACAAGCGGTGGAGCA    960
          ************************************************************

ATG-F3    TGTGGTTTAATTCGAAGCTACGCGAAGAACCTTACCAGGTCTTGACATCTTGCGCTAACC    988
ATG-F4    TGTGGTTTAATTCGAAGCTACGCGAAGAACCTTACCAGGTCTTGACATCTTGCGCTAACC    1020
          ************************************************************

ATG-F3    TTAGAGATAAGGCGTTCCCTTCGGGGACGCAATGACAGGTGGTGCATGGTCGTCGTCAGC    1048
ATG-F4    TTAGAGATAAGGCGTTCCCTTCGGGGACGCAATGACAGGTGGTGCATGGTCGTCGTCAGC    1080
          ************************************************************

ATG-F3    TCGTGTCGTGAGATGTTGGGTTAAGTCCCGCAACGAGCGCAACCCTTGTTACTAGTTGCC    1108
ATG-F4    TCGTGTCGTGAGATGTTGGGTTAAGTCCCGCAACGAGCGCAACCCTTGTTACTAGTTGCC    1140
          ************************************************************

ATG-F3    AGCATTAAGTTGGGCACTCTAGTGAGACTGCCGGTGACAAACCGGAGGAAGGTGGGGACG    1168
ATG-F4    AGCATTGAGTTGGGCACTCTAGTGAGACTGCCGGTGACAAACCGGAGGAAGGTGGGGACG    1200
          ****** *****************************************************

ATG-F3    ACGTCAGATCATCATGCCCCTTATGACCTGGGCTACACACGTGCTACAATGGACGGTACA    1228
ATG-F4    ACGTCAGATCATCATGCCCCTTATGACCTGGGCTACACACGTGCTACAATGGACGGTACA    1260
          ************************************************************

ATG-F3    ACGAGTCGCAAGCTCGCGAGAGTAAGCTAATCTCTTAAAGCCGTTCTCAGTTCGGACTGT    1288
ATG-F4    ACGAGTCGCAAACTCGCGAGAGTAAGCTAATCTCTTAAAGCCGTTCTCAGTTCGGACTGT    1320
          *********** ************************************************

ATG-F3    AGGCTGCAAGTCGCCTACACGAAGTCGGAATCGCTAGTAATCGCGGATCAGCATGCCGCG    1348
ATG-F4    AGGCTGCAAGTCGCCTACACGAAGTCGGAATCGCTAGTAATCGCGGATCAGCATGCCGCG    1380
          ************************************************************

ATG-F3    GTGAATACGTTCCCGGGCCTTGTACACACCGCCCGTCACACCATGGGAGTTTGTAACGCC    1408
ATG-F4    GTGAATACGTTCCCGGGCCTTGTACACACCGCCCGTCACACCATGGGAGTTTGTAACGCC    1440
          ************************************************************

ATG-F3    CAAAGTCGGTGGCCTAACCTTTATGGAGGAGC-----------------------------    1438
ATG-F4    CAAAGTCGGTGGCCTAACCTTTATGGAGGGAGCCGCCTAAGGCGGGACAGATGACTGGGG    1500
          ********************************

ATG-F3    --------------------    1438
ATG-F4    TGAAGTCGTAACAGGAAACCCG    1523
```

COMPOSITION COMPRISING *LACTOBACILLUS REUTERI* ATG-F4 FOR PREVENTION OR TREATMENT OF MUSCULAR DISORDER

CROSS-REFERENCE TO RELATED APPLICATIONS

This application is a National Stage of International Application No. PCT/KR2019/017674 filed Dec. 13, 2019, which claims priority to Korean Patent Application No. 10-2019-0093050 filed Jul. 31, 2019, the entire disclosures of which are incorporated herein by reference.

TECHNICAL FIELD

The present invention relates to a composition for the prevention or treatment of a muscular disorder, the composition including a *Lactobacillus reuteri* ATG-F4 strain. More specifically, the present invention relates to a composition for the prevention or treatment of sarcopenia, the composition containing *L. reuteri* ATG-F4.

BACKGROUND ART

Recently, Korea has rapidly become an aging society due to an increase in the average life expectancy. As of 2018, the number of people aged 65 and over was 7,381,000, accounting for 14.3% of the entire population (2018 Statistics on the Aged, Statistics Korea). Many physical changes occur as aging progresses, and the most representative biological change among them is sarcopenia.

In general, the best way to prevent sarcopenia in everyday life is preventing muscle loss through continued use of muscles, but muscular atrophy may also occur due to muscle degeneration when it becomes impossible to use the muscles regardless of one's will in cases such as injury or disability. Therefore, for these cases, there is a need for measures against muscle loss through stimulation of the muscles or prevention of muscle degeneration and research on those countermeasures.

Muscular atrophy occurs due to factors such as damage to the muscle tissue due to absence of mechanical stimulation such as reduced use of the muscle, destruction of the muscle by direct injury or physical elements, impaired recovery of the muscle cells due to aging, and impairment of muscle use due to damage to the nerves that control muscular activity (Booth F W., J Appl Physiol RespirEnviron Exerc Physiol., 1982).

Sarcopenia is a typical degenerative neuromuscular disease characterized by a decrease in both muscle mass and muscle strength that occurs with age. The clinical symptoms of sarcopenia are more active in men than in women and start to appear at the age of 50 and over. In those aged 80 and over, one in two people has sarcopenia, and the person's muscle mass, motor ability, and muscle strength are reduced significantly, ultimately preventing the person from living independently.

A diet which includes 20 to 30 g of high-quality protein per meal has been recommended for the prevention of sarcopenia. However, that amount can only be reached by consuming 4 to 5 eggs or about 120 g of chicken breast per meal, which in reality is very difficult for ordinary people to put into practice, and therefore, many people are choosing protein supplements as an alternative. However, as this can also cause excessive protein intake, it is highly likely to cause side effects. Moreover, since a high-protein diet may not possible due to the presence of kidney disease and decrease of kidney functions with age, there is a need for an alternative to a high-protein diet as a way of preventing sarcopenia.

Therefore, while studying treatment methods without side effects such as antibiotic resistance and excessive protein intake for the prevention or treatment of sarcopenia and muscular atrophy, the present inventors found that the *L. reuteri* ATG-F4 strain is effective in muscle rehabilitation and strengthening and made a composition for the prevention or treatment of sarcopenia and muscular atrophy, the composition including the *L. reuteri* ATG-F4 strain.

DOCUMENTS OF RELATED ART

Patent Documents (Patent Document 1) Korean Patent No. 10-1951919 (Title of invention: NOVEL *LACTOBACILLUS REUTERI* ATG-F4 STRAIN HAVING FUNCTION OF ENHANCING DOPAMINE SECRETION AND COMPOSITION COMPRISING SAME FOR PREVENTION OR TREATMENT OF PSYCHOPATHY, Applicant: AtoGEN Co., Ltd., Registration date: Feb. 19, 2019)

(Patent Document 2) Korean Patent No. 10-1997060 (Title of invention: COMPOSITION COMPRISING FERMENTED DEAR ANTLER AS ACTIVE INGREDIENT FOR PREVENTION OR TREATMENT OF MUSCULAR DISORDER, OR IMPROVEMENT OF MUSCULAR FUNCTION, Applicant: Herb N Solution Co., Ltd., Registration date: Jul. 1, 2019)

(Patent Document 3) Korean Patent No. 10-1800632 (Title of invention: PHARMACEUTICAL COMPOSITION, FOOD COMPOSITION OR FOOD ADDITIVES COMPRISING *ENTEROCOCCUS FAECALIS*, CULTURE FLUID THEREOF OR HEAT-KILLED E. *FAECALIS* AS ACTIVE INGREDIENT FOR PREVENTION, AMELIORATION, OR TREATMENT OF MUSCLE LOSS, WEAKENING, AND ATROPHY, Applicant: Industry-Academic Cooperation Foundation, Yonsei University and 2 others, Registration date: Nov. 17, 2017)

(Patent document 4) Korean Patent Application Publication No. 10-2013-0048946 (Title of invention: ANTI-CANCER COMPOSITION COMPRISING *LACTOBACILLUS REUTERI* C S 132 OR CULTURE FLUID THEREOF, Applicant: Industry-Academic Cooperation Foundation of the Catholic University of Korea, Publication date: May 13, 2013)

DISCLOSURE

Technical Problem

The objective of the present invention is to provide a composition for the prevention or treatment of a muscular disorder, the composition including a *L. reuteri* ATG-F4 strain (Accession No. KCTC13717BP).

Technical Solution

The present invention relates to a composition for the prevention or treatment of a muscular disorder, the composition including a *L. reuteri* ATG-F4 strain (Accession No. KCTC13717BP).

The strain may be selected from cells of the strain, a lysate of the cells, a culture of the strain, a culture fluid resulting from removing the cells from the culture of the strain, an extract of the cells of the strain, an extract of the culture of the strain, and an extract of the culture fluid resulting from removing the cells from the culture of the strain.

The muscular disorder may be any one of the following: sarcopenia, muscular atrophy, cardiac atrophy, atony, muscular dystrophy, muscular degeneration, and muscle weakness.

The composition may have an effect of increasing the muscle mass of one or more muscles selected from the group consisting of the tibialis anterior muscle, gastrocnemius muscle, extensor digitorum longus muscle, and soleus muscle.

The present invention relates to a pharmaceutical composition for the prevention or treatment of a muscular disorder, the pharmaceutical composition including the composition recited above.

Another invention relates to a health functional food for the prevention or amelioration of a muscular disorder, the health functional food including the composition recited above.

In addition, the present invention relates to a composition for increasing muscle mass, the composition including a *L. reuteri* ATG-F4 strain (Accession No. KCTC13717BP).

The strain may be selected from cells of the strain, a lysate of the cells, a culture of the strain, a culture fluid resulting from removing the cells from the culture of the strain, an extract of the cells of the strain, an extract of the culture of the strain, and an extract of the culture fluid resulting from removing the cells from the culture of the strain.

Hereinafter, the invention will be described in detail.

The physiological/genetic information of the *L. reuteri* ATG-F4 (Accession No. KCTC13717BP) strain is disclosed in International Patent Application No. PCT/KR2019/006937 (corresponding to Korean Patent No. 10-1951919, titled "NOVEL *LACTOBACILLUS REUTERI* ATG-F4 STRAIN HAVING FUNCTION OF ENHANCING DOPAMINE SECRETION AND PHARMACEUTICAL COMPOSITION COMPRISING SAME FOR PREVENTION OR TREATMENT OF PSYCHOPATHY", assigned to Ato-GEN Co., Ltd., and registered as of Feb. 19, 2019)

The present invention relates to a composition including the *L. reuteri* ATG-F4 strain, and the composition has an effect of preventing or treating a muscular disorder. The muscular disorder may be any one or more disorders selected from the group consisting of muscular atrophy, sarcopenia, cardiac atrophy, atony, muscular dystrophy, muscular degeneration, and muscle weakness. More preferably, the composition of the present invention may be more effectively used to prevent or treat sarcopenia among the muscular disorders.

The composition of the present invention has the effect of increasing the muscle mass of one or more muscles selected from the group consisting of the tibialis anterior muscle, gastrocnemius muscle, extensor digitorum longus muscle, and soleus muscle, through which it can have the effect of preventing or treating a muscular disorder.

the strain of the present invention may be selected from among cells of the *L. reuteri* ATG-F4 strain, a lysate of the cells, a culture of the strain, a culture fluid resulting from removing the cells from the culture of the strain; an extract of the cells of the strain; an extract of the culture of the strain; and an extract of the culture fluid resulting from removing the cells from the culture of the strain.

In addition, the present invention may provide a pharmaceutical composition including the *L. reuteri* ATG-F4 strain or the culture thereof. The pharmaceutical composition is effective in the prevention, amelioration, or treatment of sarcopenia or muscular atrophy.

The *L. reuteri* ATG-F4 strain or the culture thereof may be added to the pharmaceutical composition of the present invention in an amount of 0.001 to 100 wt %.

The pharmaceutical composition may be formulated in the form of oral dosage forms such as powders, granules, tablets, capsules, suspensions, emulsions, syrups, and aerosols; external preparations; suppositories; and sterile solutions for injection according to the respective conventional methods. Carriers, excipients, and diluents that may be included in the pharmaceutical composition include lactose, dextrose, sucrose, sorbitol, mannitol, xylitol, erythritol, maltitol, starch, acacia gum, alginate, gelatin, calcium phosphate, calcium silicate, cellulose, methylcellulose, microcrystalline cellulose, polyvinyl pyrrolidone, water, methyl hydroxybenzoate, propyl hydroxybenzoate, talc, magnesium stearate, and mineral oil. At the time of formulation, the pharmaceutical formulation is prepared using commonly used diluents or excipients such as fillers, extenders, binders, wetting agents, disintegrants, and surfactants. Solid preparations for oral administration include tablets, pills, powders, granules, capsules, and the like, and these solid preparations include the strain of the present invention, or the culture thereof mixed with at least one or more excipients, e.g. starch, calcium carbonate, sucrose or lactose, and gelatin. In addition to simple excipients, lubricants such as magnesium stearate, and talc may also be used. Liquid preparations for oral administration include suspensions, oral liquids, emulsions, syrups, and the like. In addition to water and liquid paraffin, which are commonly used simple diluents, various excipients such as wetting agents, sweeteners, fragrances, and preservatives may be included. Preparations for parenteral administration include sterile aqueous solutions, non-aqueous solutions, suspensions, emulsions, freeze-dried preparations, and suppositories. Non-aqueous solvents and suspensions include propylene glycol, polyethylene glycol, vegetable oils such as olive oil, and injectable esters such as ethyl oleate. As a suppository base, Witepsol®, Macrogol®, Tween 61®, cacao butter, laurin butter, glycerogelatin, and the like may be used.

The dosage of the pharmaceutical composition of the present invention may vary depending on the age, sex, and weight of the subject to be treated, the specific disease or pathological condition to be treated, the severity of the disease or pathological condition, the route of administration, and the judgment of the prescriber. The determination of dosage based on these factors is within the capability of a person skilled in the art, and typically dosages range from 0.01 mg/kg/day to approximately 2000 mg/kg/day. A more preferred dosage is 1 mg/kg/day to 500 mg/kg/day. Administrations may take place once a day or in several divided doses. The dosage does not limit the scope of the present invention in any way.

The pharmaceutical composition of the present invention may be administered to mammals such as mice, livestock, and humans by various routes. Any mode of administration can be envisaged, e.g. oral administration, rectal administration, and intravenous, intramuscular, subcutaneous, intrauterine dural, or intracerebroventricular injection. Since the strain of the present invention has almost no toxicity and side effects, it is a drug that can be safely used even when taken for a long period of time for prophylactic purposes.

In addition, the present invention provides a health functional food including the *L. reuteri* ATG-F4 strain or the culture thereof, and a food supplement additive that is sitologically acceptable.

The *L. reuteri* ATG-F4 strain or the culture fluid thereof may be added to the health functional food of the present invention in an amount of 0.001-100 wt %. The health functional food of the present invention includes forms such as tablets, capsules, pills, liquids, and the like, and the foods to which the strain of the present invention can be added include, for example, drinks, meat, sausage, bread, candies, snacks, noodles, ice cream, dairy products, soups, sports drinks, beverages, alcoholic beverages, gum, tea, and vitamin complexes.

The concept of treatment induced by the composition containing the strain of the present invention or the culture fluid thereof is broad, including a condition being prevented, ameliorated, improved or treated due to intake of the strain of the present invention or the culture fluid thereof.

Advantageous Effects

The present invention relates to a composition for the prevention or treatment of a muscular disorder, the composition including a *L. reuteri* ATG-F4 strain (Accession No. KCTC13717BP). Since the strain exhibits the effect of improving muscle rehabilitation and motor ability by increasing the muscle mass in skeletal muscles, the strain can be used as an ingredient of a composition for the prevention or treatment of a muscular disorder.

DESCRIPTION OF DRAWINGS

FIG. 8 represents the 16S rRNA sequence of *L. reuteri* ATG-F4 (SEQ ID NO: 1);

FIG. 9 represents the 16S RNA sequence of *L. casei* ATG-F1 (SEQ ID NO: 2);

FIG. 10 represents the 16S rRNA sequence of *L. reuteri* ATG-F3 (SEQ ID NO: 3);

FIG. 11A shows the differences between the 16S rRNA sequences of the ATG-F3 (SEQ ID NO: 3) and F4 (SEQ ID NO: 1) strains; and FIG. 11B shows the differences between the 16S rRNA sequences of the ATG-F3 (SEQ ID NO: 3) and F4 (SEQ ID NO: 1) strains.

BEST MODE

Figure 1:
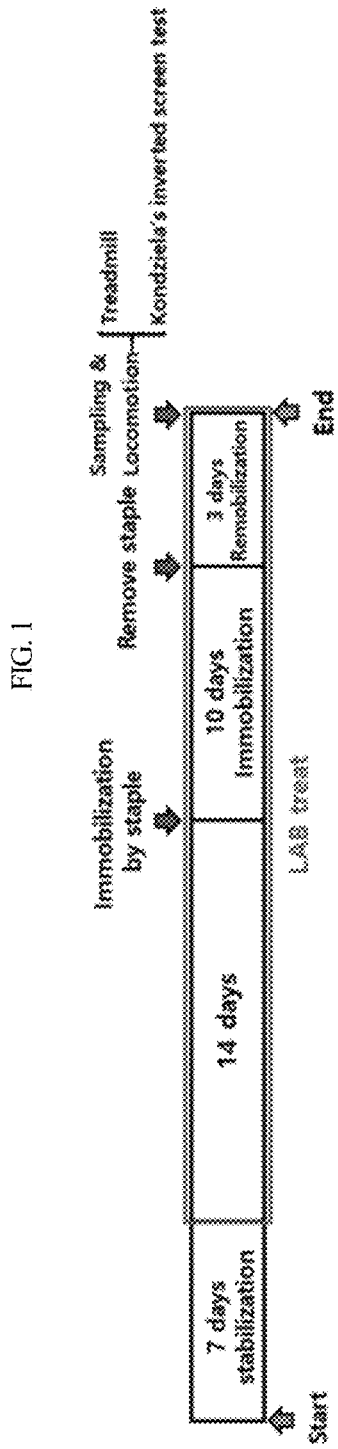
FIG. 1 is a schedule for animal testing to see muscle recovery in mice according to Experimental Example 1.

Hereinafter, preferred embodiments of the present invention will be described in detail. However, the present invention is not limited to the embodiments described herein and may be embodied in other forms. Rather, the embodiments are provided so that this disclosure will be thorough and complete, and will fully convey the spirit of the invention to those skilled in the art.

Embodiment 1. Isolation and Identification of ATG-F1, ATG-F3, and ATG-F4 Lactic Acid Bacteria Samples were prepared through three times of donation of a newborn's feces, on Jan. 8, 2016, May 31, 2018, and Jun. 4, 2018, respectively, and were diluted with 0.9% saline through 10-fold serial dilutions, and the diluted samples were smeared on de Man, Rogosa, Sharpe (MRS) media and incubated at 37° C. for about 48 hours.

Colonies of the lactic acid bacteria formed on the incubated MRS medium were observed under a microscope to select ones that showed the morphology of genus *Bacillus* and were catalase-negative. Whole genome sequencing was performed on them, and the strains were named ATG-F1, ATG-F3, and ATG-F4 (also referred to as F1, F3, and F4, respectively).

The 16S rRNA sequencing of the ATG-F1, ATG-F3, and ATG-F4 strains was commissioned to Solgent Co., Ltd. (Daejeon). The primers 27F (5'-AGA GTT TGA TCC TGG CTC AG-3'), 518F (5'-CCA GCA GCC GCG GTA ATA C-3'), 907R (5'-CCG TCA ATT CMT TTR AGT TT-3'), and 1492R (5'-GGT TAC CTT GTT ACG ACT T-3') were used for sequencing for a total of 4 sequence reads, and the contig sequences derived through sequence alignment of each reading were analyzed using the BLAST online tool (blast.ncbi.nlm.nih.gov/Blast.cgi) of the National Center for Biotechnology Information (NCBI). The 16S rRNA sequences of the above strains are represented in FIGS. 8 through 10.

As a result of comparing the nucleotide sequences of SEQ ID NOs: 1 to 3 obtained through 16S rRNA sequencing to the BLAST database of NCBI, the 16S rRNA sequences of the ATG-F3 and ATG-F4 strains were shown to match 99.9% with that of the *L. reuteri* strain IRT and therefore taxonomically belong to *L. reuteri*. In addition, the ATG-F1 strain was found to belong to *L. casei*.

Accordingly, the strain of the present invention was named *L. reuteri* ATG-F4. The strain is specifically disclosed in PCT/KR2019/006937 (Korean Patent No. 10-1951919, Title of invention: NOVEL *LACTOBACILLUS REUTERI* ATG-F4 STRAIN HAVING FUNCTION OF ENHANCING DOPAMINE SECRETION AND COMPOSITION COMPRISING SAME FOR PREVENTION OR TREATMENT OF PSYCHOPATHY)

Next, the differences between the 16S rRNA sequences of the strains ATG-F3 and F4, which are of the same species, were analyzed.

The differences between sequences were analyzed using Clustal Omega of EMBL-EBI (www.ebi.ac.uk/Tools/msa/clustalo), and this is shown in FIGS. 11A and 11B below.

Referring to FIGS. 11A and 11B, although the ATG-F3 and F4 strains are of the same species, differences in the 16S rRNA sequences have been found, and based on this, it can be expected that there would be differences in the physiological characteristics.

Next, a API®50 CH test (BioMerieux, France) was performed for identification and characterization of the bacteria based on the carbohydrate fermentation patterns. To put it briefly, pure cultured lactic acid bacteria was suspended in 10 ml of API®50 CHL medium to an $OD_{600}$ of about 0.5, and the suspension culture was inoculated into each cupule of the API®50 CH test strip and incubated at 37° C. The carbohydrate fermentation results were checked at 24, 48, and 72 hours after inoculation. In the fermentation pattern of lactic acid bacteria ATG-F1, F3, and F4 for the 49 carbohydrates using API®50 CH, + represents a positive reaction, w represents a weak positive reaction, and – represents a negative reaction.

TABLE 1

| Carbohydrates | L. casei ATG-F1 | L. reuteri ATG-F3 | L. reuteri ATG-F4 |
|---|---|---|---|
| Glycerol | – | – | – |
| Erythritol | – | – | – |
| D-Arabinose | – | – | w |
| L-Arabinose | – | + | + |
| Ribose | w | + | + |
| D-Xylose | – | – | w |
| L-Xylose | – | – | – |
| Adonitol | w | – | w |
| Methyl-βD-Xylopyranoside | – | – | – |
| Galactose | + | + | + |
| Glucose | + | + | + |
| Fructose | + | – | – |
| Mannose | + | – | – |
| Sorbose | + | – | – |
| Rhamnose | – | – | w |
| Dulcitol | – | – | – |
| Inositol | – | – | w |
| Mannitol | + | – | – |
| Sorbitol | + | – | w |
| Methyl-αD-Mannopyranoside | – | – | – |
| Methyl-αD-Glucopyranoside | – | – | w |
| N-Acetylglucosamine | + | – | – |
| Amygdalin | w | – | – |
| Arbutin | + | – | w |
| Esculin | + | – | + |
| Salicin | + | – | w |
| Cellobiose | + | – | w |
| Maltose | w | + | + |
| Lactose | – | + | + |
| Melibiose | – | + | + |
| Sucrose | + | + | + |
| Trehalose | + | – | – |
| Inulin | + | – | – |
| Melezitose | + | – | – |
| Raffinose | – | + | + |
| Starch | – | – | – |
| Glycogen | – | – | – |
| Xylitol | – | – | – |
| Gentiobiose | + | – | w |
| Turanose | + | – | – |
| Lyxose | – | – | – |
| Tagatose | + | – | – |
| D-Fucose | – | – | – |
| L-Fucose | – | – | + |
| D-Arabitol | – | – | w |
| L-Arabitol | – | – | w |
| Gluconate | w | w | + |
| 2-keto-glugonate | – | – | – |
| 5-keto-gluconate | – | – | – |

As a result of examining the glycolytic capacity of ATG-F1 lactic acid bacteria, weak positive reactions (changes from blue to green within 48 hours) were observed for ribose, adonitol, amygdalin, maltose, and gluconate, and positive reactions (changes from blue to yellow within 48 hours) were observed for galactose, glucose, fructose, mannose, mannitol, sorbitol, N-acetylglucosamine, arbutin, esculin, salicin, cellobiose, sucrose, trehalose, inulin, melechtose, gentiobiose, turanose, and tagatose. The ATG-F1 bacteria was found to have the ability to break down a total of 24 types of carbohydrates. As a result of examining the glycolytic capacity of ATG-F3 lactic acid bacteria, a weak positive reaction (a change from blue to green within 48 hours) was observed for gluconate, and positive reactions (changes from blue to yellow within 48 hours) were observed for L-arabinose, ribose, galactose, glucose, maltose, lactose, melibiose, sucrose and raffinose. The ATG-F3 bacteria was found to have the ability to break down a total of 10 types of carbohydrates.

As a result of examining the glycolytic capacity of ATG-F4 lactic acid bacteria, weak positive reactions (changes from blue to green within 48 hours) were observed for D-arabinose, D-xylose, adonitol, rhamnose, inositol, sorbitol, methyl-αD-glucopyranoside, arbutin, salicin, cellobiose, gentiobiose, L-arabitol, and D-arabitol, and positive reactions (changes from blue to yellow within 48 hours) were observed for L-arabinose, ribose, galactose, glucose, esculin, maltose, lactose, melibiose, sucrose, raffinose, L-fucose, and gluconate. In addition, the ATG-F4 bacteria was found to have the ability to break down a total of 25 types of carbohydrates.

It can be seen on the basis of the different results of examining the glycolytic capacities of ATG-F1, F3, and F4 lactic acid bacteria that their respective physiological characteristics are different.

Embodiment 2. Culture of Lactic Acid Bacteria of the Genus *Lactobacillus*

In the present embodiment, *Lactobacillus casei* ATG-F1, *Lactobacillus reuteri* ATG-F3, and *Lactobacillus reuteri* ATG-F4 (Accession No. KCTC13717BP) were used. Each lactic acid bacteria was cultured in MRS broth (Difco™ Lactobacilli MRS Broth) at 37° C. for 24 hours, and the cultured lactic acid bacteria were centrifuged at 12,000 g for 10 minutes to obtain only the cells, which were then suspended in 0.85% (v/v) saline for use in each experiment.

Experimental Example 1. Confirmation of Activation of Muscle Recovery in Sarcopenia-Induced Model Prior to all animal experiments conducted according to the present experimental example, the animal experiments were approved by the Institutional Animal Care and Use Committee (IACUC) of AtoGEN Co., Ltd. (Approval No.: ATG-IACUC-REV-180810) in accordance with the appropriate procedures and guidance on ethical animal experiments was provided. The animals used in the present experiment were 4-week-old C57BL/6J, purchased from Central Lab Animal Inc. (Seoul, Korea) for experiments.

In the present experimental example, an animal experiment was performed to investigate the improvement of muscle rehabilitation and motor ability depending on the intake of *L. casei* ATG-F1, *L. reuteri* ATG-F3 or *L. reuteri* ATG-F4 lactic acid bacteria in a sarcopenia-induced model (a model of skeletal muscle atrophy induced by immobilization using a skin stapler in mice).

A total of 25 4-week-old C57BL/6J mice (male) were tested using 5 mice per experimental group, and the experiment was performed according to the schedule shown in FIG. 1. First, the mice were given an acclimation period of 1 week and then fed lactic acid bacteria for 2 weeks from the age of 5 weeks. The control group (Ctrl) and the sarcopenia-induced group (Ctrl-Disuse) were given ad libitum access to sterile drinking water and conventional feed. The experimental groups (the groups that were fed lactic acid bacteria after inducing sarcopenia (F1, F3, and F4)) were given ad libitum access to lactic acid bacteria which had been diluted in sterile drinking water at $10^7$ CFU/ml. At 7 weeks of age, both hind legs of the mice were immobilized for 10 days using surgical skin staplers (Covidien Royal 35W skin stapler) (Caron, A. Z. et al., 2009; Du et al., 2011). After 10 days of immobilization of the legs, the staples were removed, and a recovery period of 3 days was given.

After the recovery period, to examine the muscle rehabilitation capacity of the control group, sarcopenia-induced group, and experimental groups, the body weight (BW), TA weight per body weight (TA/Body weight), and the weights of 4 types of skeletal muscles (tibialis anterior; gastrocnemius; extensor digitorum longus; and soleus which will be referred to as TA, GA, EDL, and SOL, respectively hereinafter) were compared by removing the muscles, the results of which are provided in FIGS. 2 and 3.

Figure 2A:
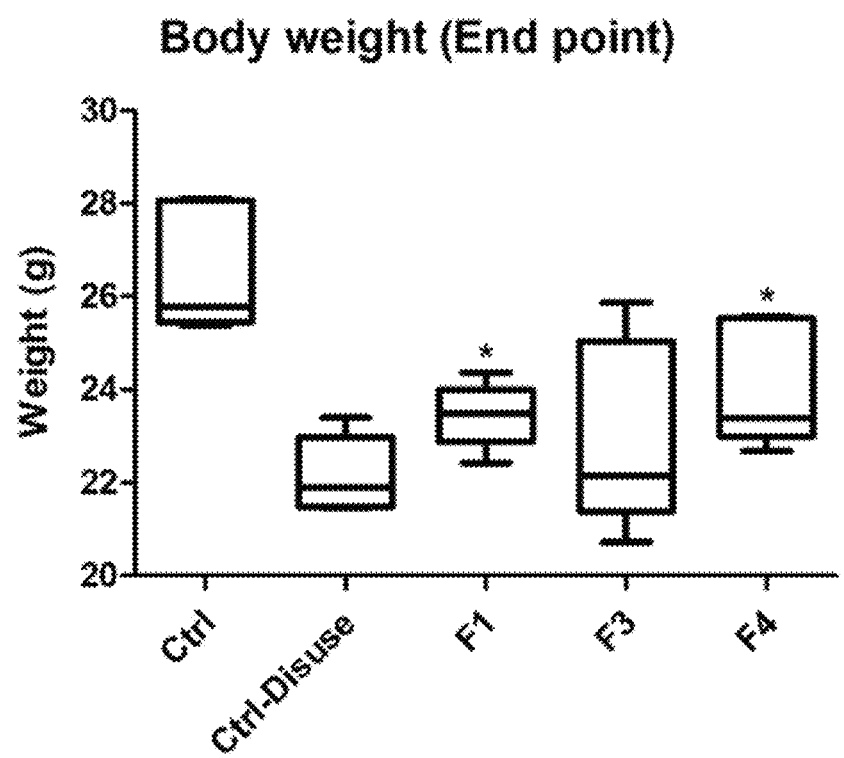
FIGS. 2A and 2B are graphs showing the increase in body weight and ratio of tibialis anterior (TA) to body weight as the result of recovery from muscle loss according to Experimental Example 1.
Figure 2B:
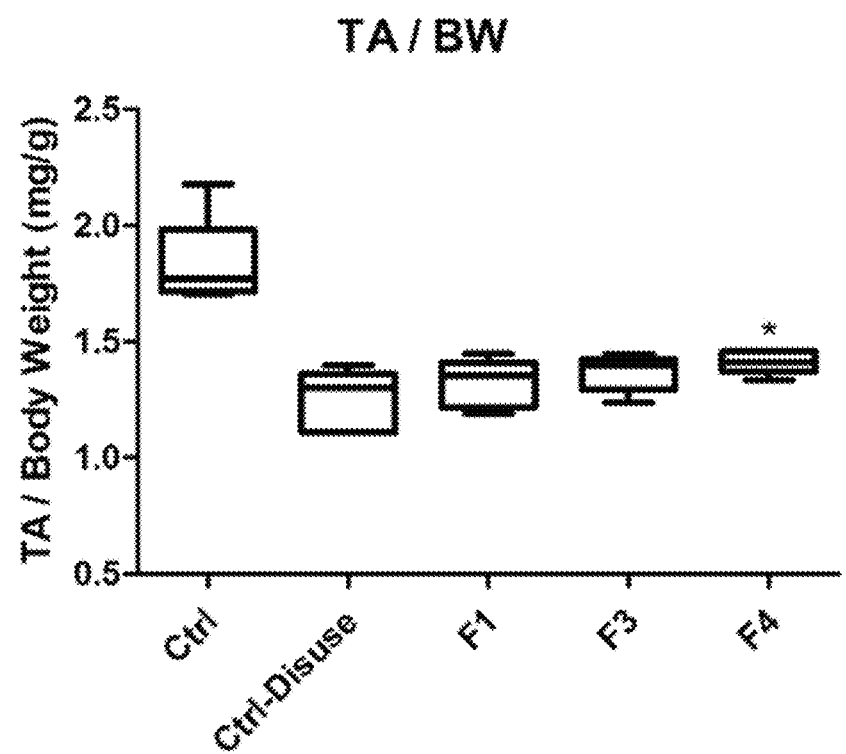
Figure 3A:
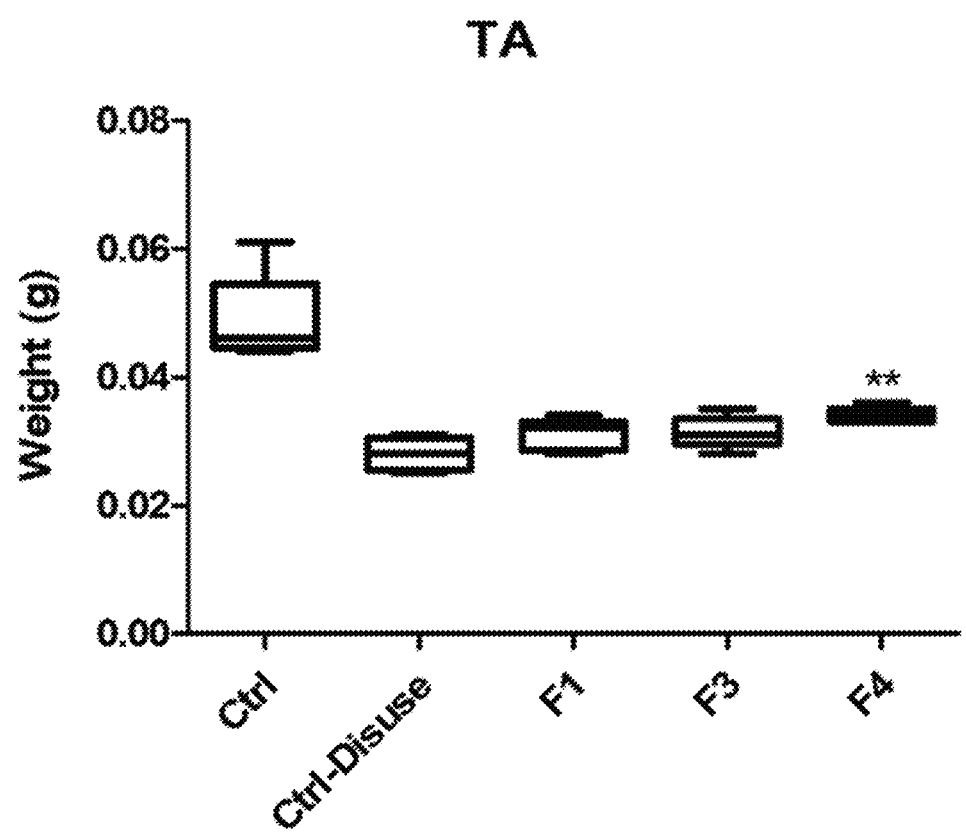
FIGS. 3A through 3D are graphs for the comparison between the weight of skeletal muscles in the experimental groups and the sarcopenia-induced group according to Experimental Example 1.
Figure 3B:
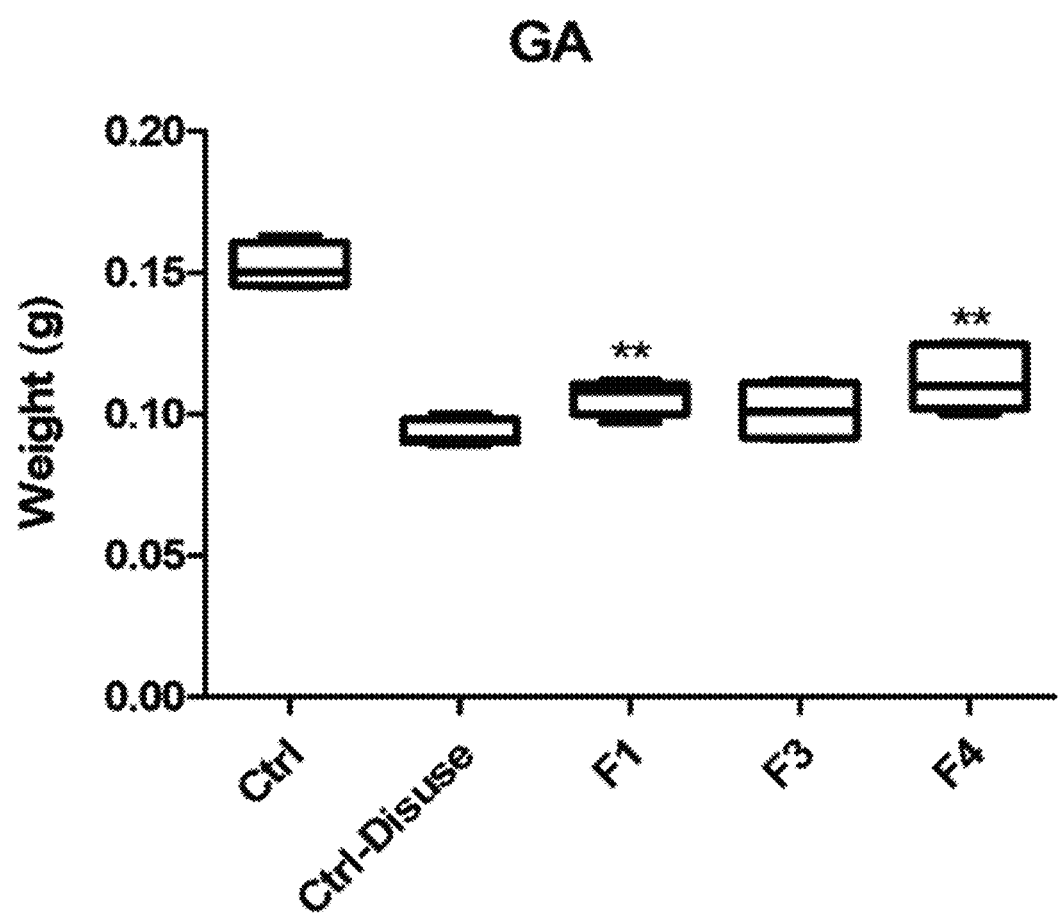
Figure 3C:
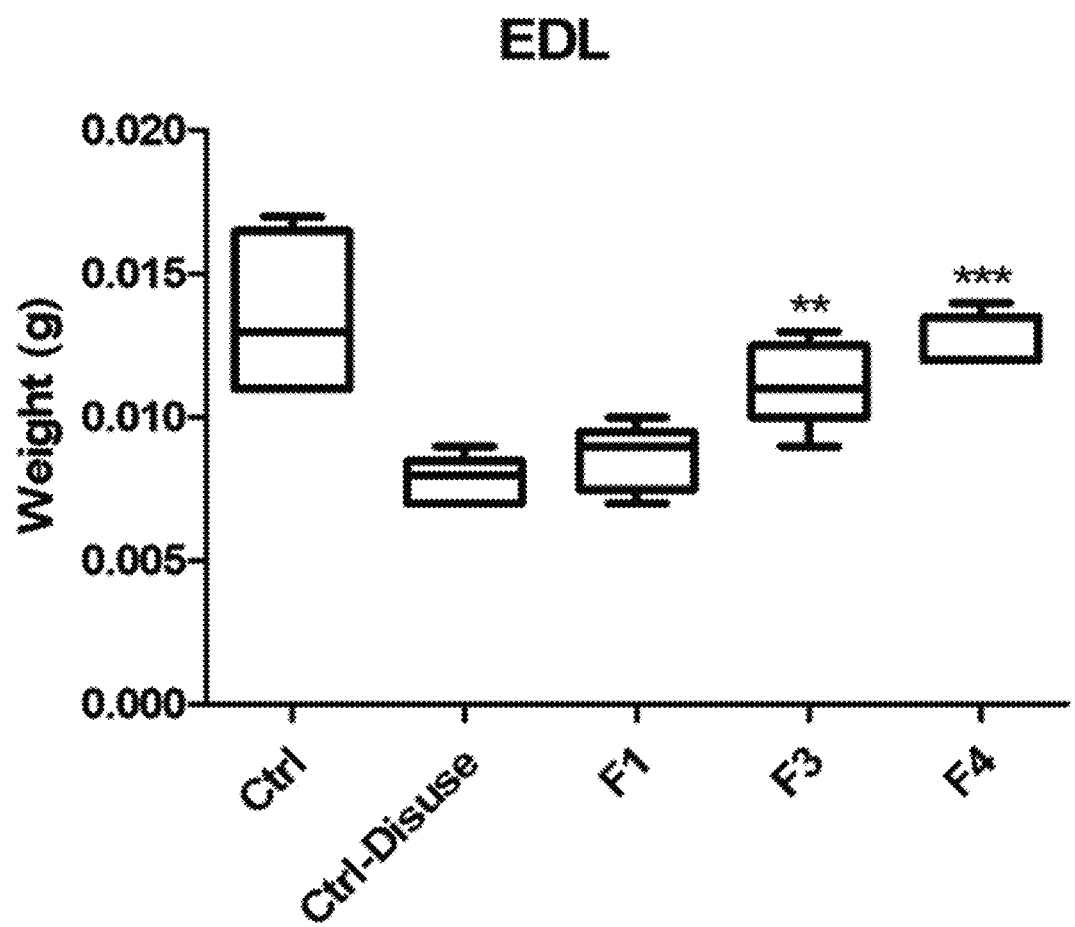
Figure 3D:
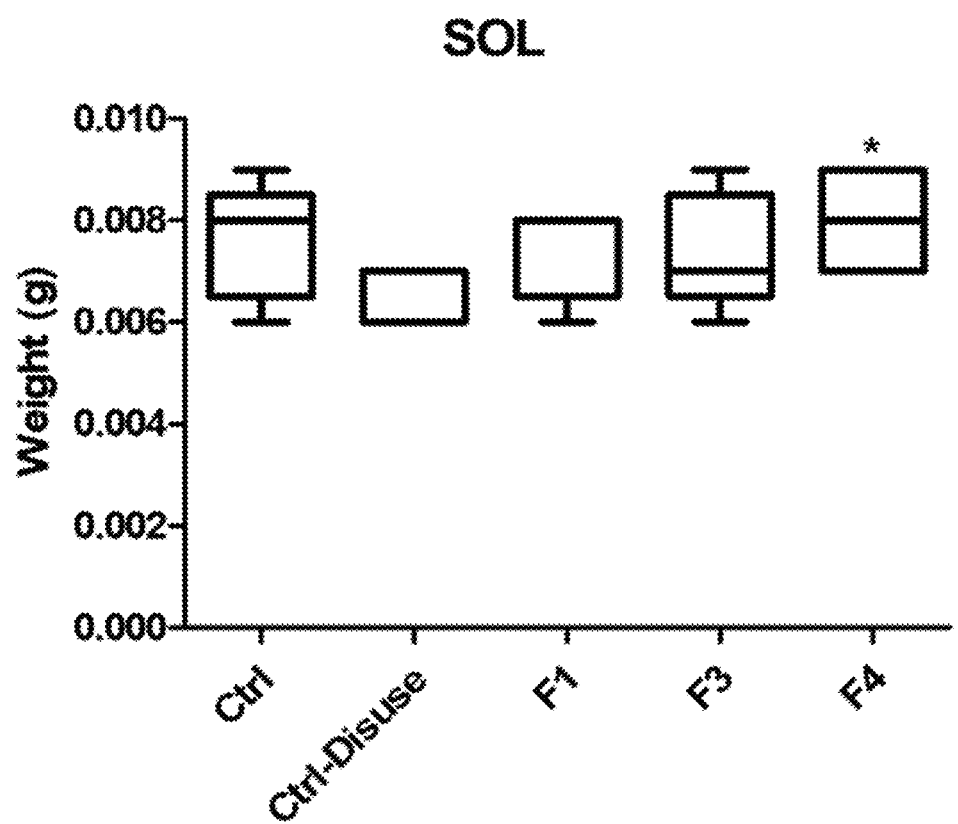

Referring to FIGS. 2A and 2B, the weights of the experimental groups with lactic acid bacteria intake increased compared to the sarcopenia-induced group (Ctrl-Disuse). TA/Body weight also increased in the experimental groups with lactic acid bacteria intake. In particular, BW and TA/Body weight of the experimental group with *L. reuteri* ATG-F4 lactic acid bacteria intake increased the most, indicating an outstanding muscle rehabilitation effect.

Referring to FIGS. 3A through 3D, the weights of all 4 types of skeletal muscles (TA, GA, EDL, and SOL) increased in the experimental groups with lactic acid bacteria intake compared to the sarcopenia-induced group. In particular, the weights of TA, GA, and SOL of the experimental group with *L. reuteri* ATG-F4 lactic acid bacteria intake increased 1.21 times compared to the sarcopenia-induced group and the weight of EDL increased 1.62 times compared to the sarcopenia-induced group.

Through this, weight and muscle mass increase as the result of recovery of sarcopenia or muscular atrophy was confirmed, and the increase in muscle mass and the rehabilitation effect were found to be the best in the experimental group with *L. reuteri* ATG-F4 lactic acid bacteria intake.

Experimental Example 2. Confirmation of the Effect of Muscle Mass Increase Due to Intake of F4 Lactic Acid Bacteria in a Healthy Model The groups were divided into a control group (Ctrl) fed with conventional feed and sterile drinking water and an experimental group (F4) fed with conventional feed and sterile drinking water including *L. reuteri* ATG-F4 at about $10^7$ CFU/ml, and 5 mice were used for each experimental group. After stabilizing 4-week-old mice for 1 week, the experiment was conducted for 4 weeks.

After 4 weeks, 4 types of skeletal muscles (TA, GA, EDL, and SOL) were removed and the weights were compared to determine the difference in muscle mass due to intake of *L. reuteri* ATG-F4 lactic acid bacteria.

Figure 4:
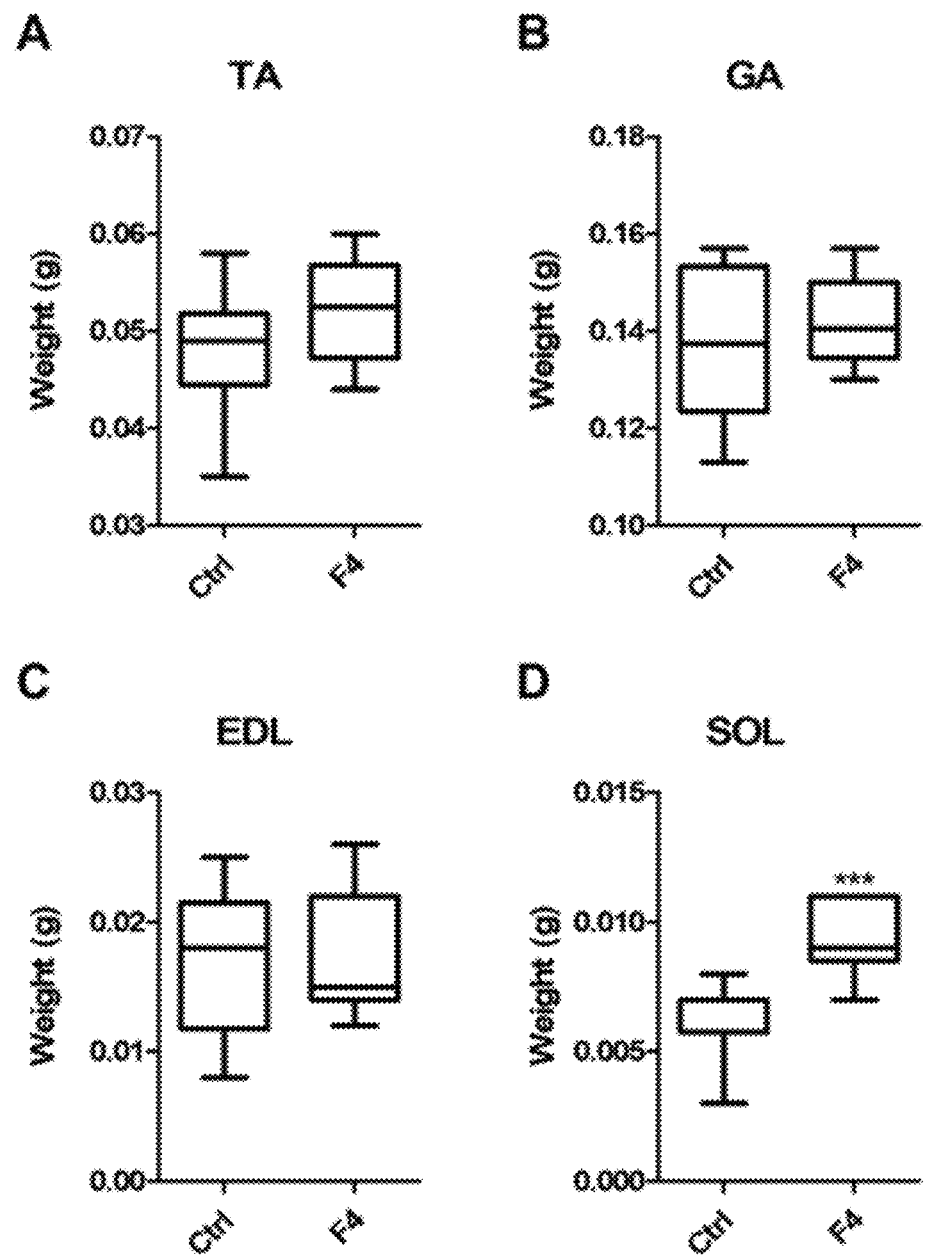
FIG. 4 is a graph representing the weight of skeletal muscles of healthy models of Experimental Example 2 when the healthy models were fed the *L. reuteri* ATG-F4 strain.

Referring to FIG. 4, the muscle mass of the skeletal muscle of the experimental group (F4) fed with the *L. reuteri* ATG-F4 strain increased. Compared to the control group, the muscle mass of TA increased 1.08 times, GA 1.03 times, EDL 1.01 times, and SOL 1.48 times, confirming that there is an effect of increasing muscle mass even in a healthy model.

Experimental Example 3. Confirmation of Activation of Muscle Recovery and Improvement of Motor Ability in Sarcopenia-Induced Mice Experimental Example 3-1. Treadmill Test A treadmill test was performed to evaluate motor ability and endurance, and the 5 lane treadmill for mice (HARVARD) was used for testing. A control group, a sarcopenia-induced group, and experimental groups (the groups that were fed lactic acid bacteria after inducing sarcopenia (F1, F3, and F4)) were set as in Experimental Example 1 and the experiment was performed. In addition, the treadmill test was performed as shown in FIG. 5 by referring to the protocol used for the running test.

Figure 5:
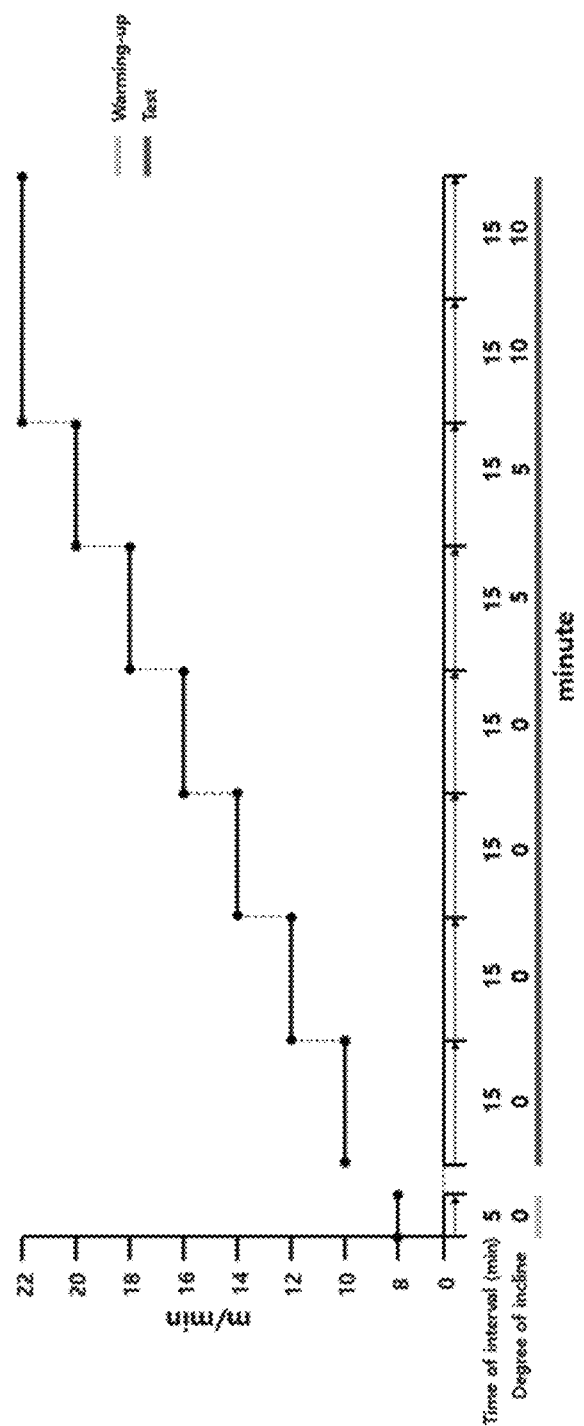
FIG. 5 is a graph representing the speed, degree of incline, and duration of the treadmill test of Experimental Example 3-1.

Referring to FIG. 5, first, the mice were made to warm up for 5 minutes at a speed of 8 m/min. At the starting point, electric stimulation of 1.25 mA was applied to induce running, and the speed was increased by 2 m/min every 15 minutes, starting at a speed of 10 m/min. Running time was measured up to a maximum of 2 hours in 8 steps. After 1 hour, the angle was raised 5°, and after an hour and a half, the angle was raised to 10°. Mice that did not run for 5 seconds despite the application of electrical stimulation were considered to be physically exhausted and the experiment was terminated. The running time and distance of the mice measured were compared after the termination of the experiment, which is provided in FIG. 6.

Figure 6A:
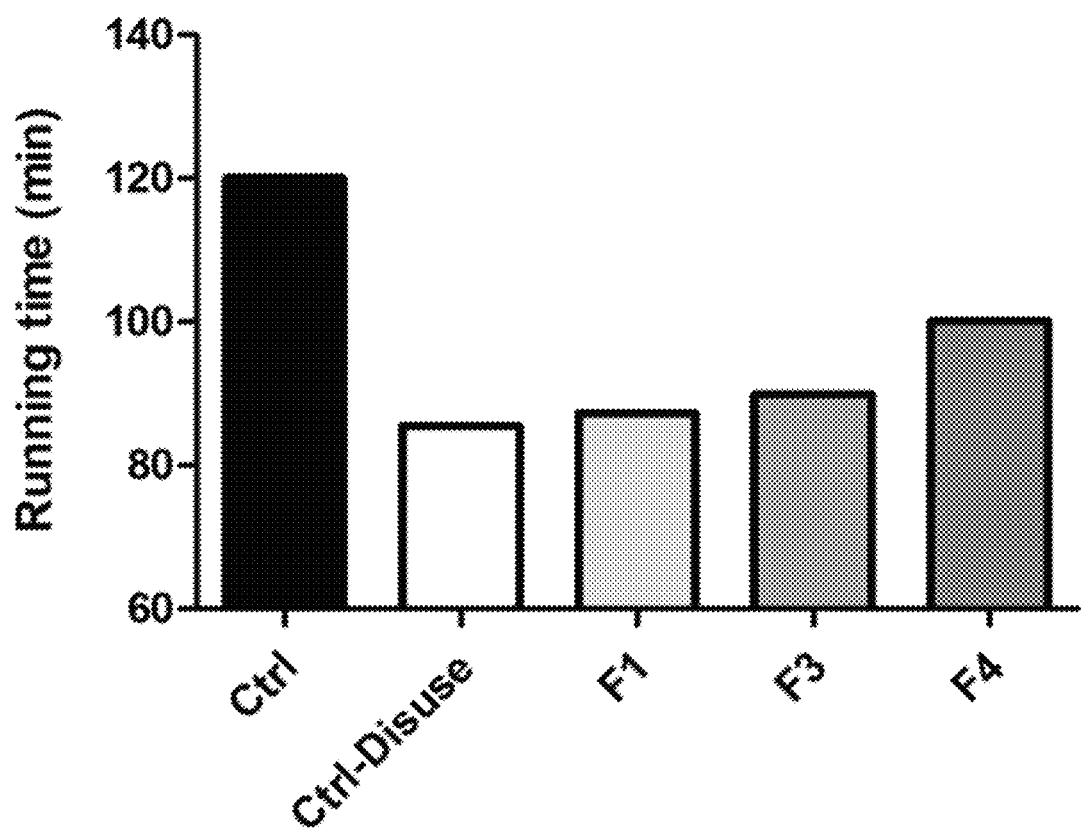
FIGS. 6A and 6B are graphs showing the results of the treadmill test for the experimental groups and the sarcopenia-induced group in Experimental Example 3-1.
Figure 6B:
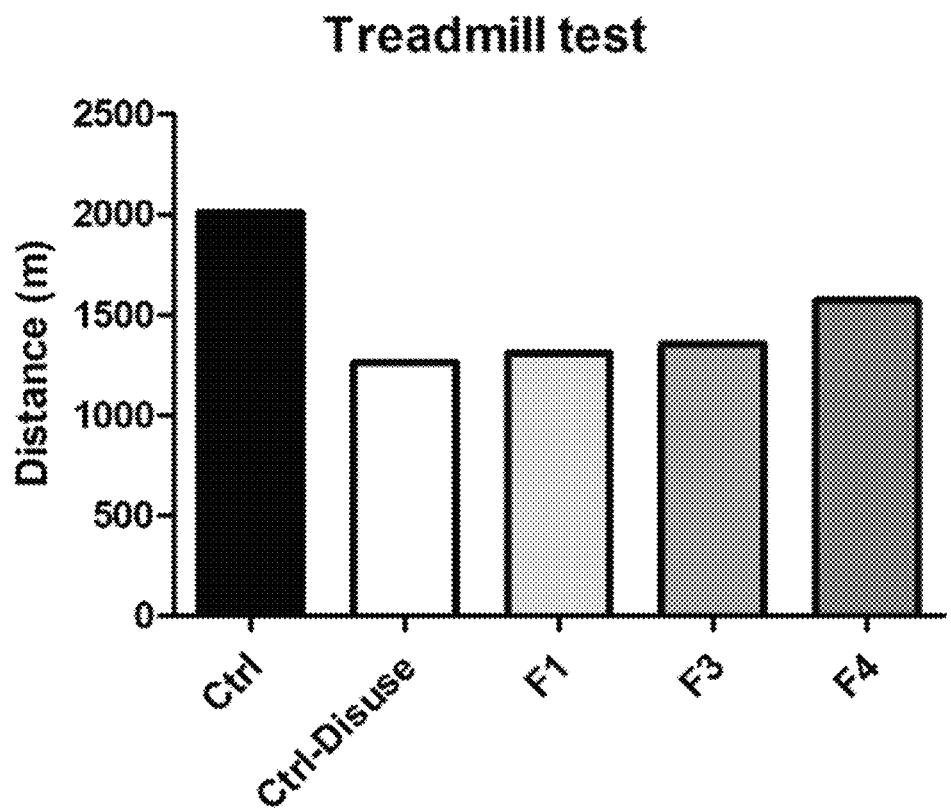

Referring to FIGS. 6A and 6B, compared to the sarcopenia-induced group, the experimental groups with lactic acid bacteria intake showed a longer running time and distance. In particular, the experimental group with intake of *L. reuteri* ATG-F4 lactic acid bacteria showed increased motor ability and endurance based on a running time which was 1.17 times longer and a running distance which was 1.25 times longer compared to the sarcopenia-induced group, confirming outstanding effects of activating muscle regeneration and rehabilitation.

Experimental Example 3-2. Kondziela's Inverted Screen Test

To evaluate muscle strength and endurance, Kondziela's inverted screen test was performed, and as in Experimental Example 1, a control group, a sarcopenia-induced group, and experimental groups (the groups that were fed lactic acid bacteria after inducing sarcopenia (F1, F3, and F4)) were set.

For Kondziela's inverted screen test, a wire mesh screen (specification: 440×330 mm, width/length of each grid being 1 mm respectively) was used (Deacon, R. M., 2013; Reekes, T. H. et al, 2016). After placing a mouse at the center of the grid and turning over the grid, the time was measured. Bedding material was laid on the floor to absorb shock from the fall, and the wire mesh screen was fixed at least 40 cm above the floor. The experiment was independently repeated three times, the fall time of the mouse was recorded, and the average value was obtained. Referring to Table 2 below, one point was given for every 60 seconds, and after 241 seconds, the maximum score of 5 was given across the board. The fall time and the score results according to the fall time are shown in FIG. 7.

TABLE 2

| Fall time of mouse (Unit:seconds) | Score |
|---|---|
| 1-60 | 1 |
| 61-120 | 2 |
| 121-180 | 3 |
| 181-240 | 4 |
| 241 and over | 5 |

Figure 7A:
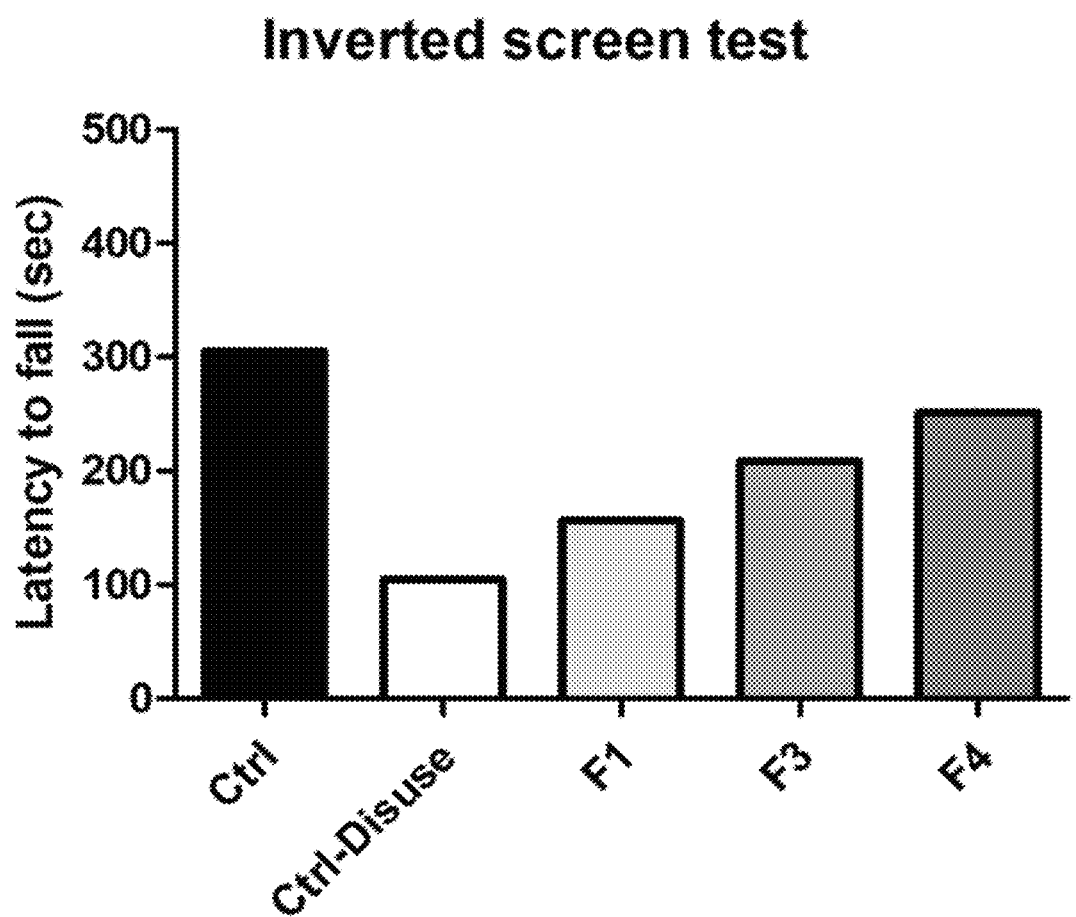
FIGS. 7A and 7B are graphs showing the results of Kondziela's inverted screen test for the experimental groups and the sarcopenia-induced group in Experimental Example 3-2.
Figure 7B:
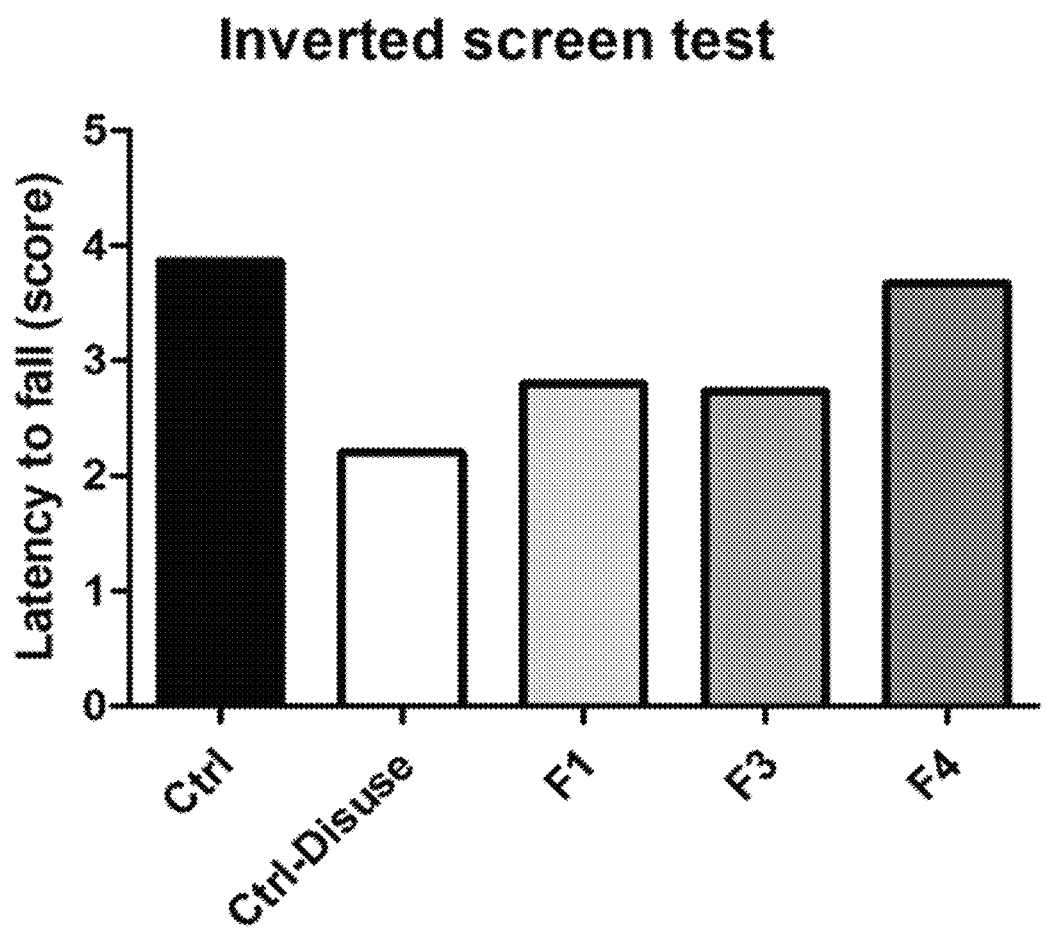

Referring to FIGS. 7A and 7B, the experimental groups with lactic acid bacteria intake held on for a longer period of time than the sarcopenia-induced group. In particular, outstanding effects of activating muscle regeneration and rehabilitation were shown through increased muscle strength and endurance, which is exhibited by the hanging time and the score based on Table 2 of the experimental group with *L. reuteri* ATG-F4 intake being 2.4 times and 1.67 times greater, respectively, than those of the sarcopenia-induced group.

The invention claimed is:

1. A method of preventing or treating a muscular disorder by administering to a subject in need thereof a composition comprising a *Lactobacillus reuteri* ATG-F4 strain deposited under Accession No. KCTC13717BP, or cells thereof, a lysate thereof, a culture thereof, a culture fluid resulting from removing the cells from the culture thereof, an extract of the cells thereof, an extract of the culture thereof, or an extract of the culture fluid resulting from removing the cells from the culture thereof.

2. The method of claim 1, wherein the muscular disorder is selected from the group consisting of sarcopenia, cardiac atrophy, atony, muscular dystrophy, muscular degeneration, and muscle weakness.

3. A method of increasing muscle mass by administering to a subject in need thereof a composition comprising a *Lactobacillus reuteri* ATG-F4 strain deposited under Accession No. KCTC13717BP, or cells thereof, a lysate thereof, a culture thereof, a culture fluid resulting from removing the cells from the culture thereof, an extract of the cells thereof, an extract of the culture thereof, or an extract of the culture fluid resulting from removing the cells from the culture thereof.

* * * * *

SEQUENCE LISTING

<160> NUMBER OF SEQ ID NOS: 3

<210> SEQ ID NO 1
<211> LENGTH: 1523
<212> TYPE: DNA
<213> ORGANISM: Unknown
<220> FEATURE:
<223> OTHER INFORMATION: Lactobacillus reuteri

<400> SEQUENCE: 1

```
tcaggatgaa cgccggcggt gtgcctaata catgcaagtc gtacgcactg gcccaactga      60
ttgatggtgc ttgcacctga ttgacgatgg atcaccagtg agtggcggac gggtgagtaa     120
cacgtaggta acctgccccg gagcggggga taacatttgg aaacagatgc taataccgca     180
taacaacaaa agccgcatgg cttttgtttg aaagatggct ttggctatca ctctgggatg     240
gacctgcggt gcattagcta gttggtaagg taacggctta ccaaggcgat gatgcatagc     300
cgagttgaga gactgatcgg ccacaatgga actgagacac ggtccatact cctacgggag     360
gcagcagtag ggaatcttcc acaatgggcg caagcctgat ggagcaacac cgcgtgagtg     420
aagaagggtt tcggctcgta aagctctgtt gttggagaag aacgtgcgtg agagtaactg     480
ttcacgcagt gacggtatcc aaccagaaag tcacggctaa ctacgtgcca gcagccgcgg     540
taatacgtag gtggcaagcg ttatccggat ttattgggcg taaagcgagc gcaggcggtt     600
gcttaggtct gatgtgaaag ccttcggctt aaccgaagaa gtgcatcgga aacgggcga     660
cttgagtgca gaagaggaca gtggaactcc atgtgtagcg gtggaatgcg tagatatatg     720
gaagaacacc agtggcgaag gcggctgtct ggtctgcaac tgacgctgag gctcgaaagc     780
atgggtagcg aacaggatta gataccctgg tagtccatgc cgtaaacgat gagtgctagg     840
tgttggaggg tttccgccct tcagtgccgg agctaacgca ttaagcactc cgcctgggga     900
gtacgaccgc aaggttgaaa ctcaaaggaa ttgacggggg cccgcacaag cggtggagca     960
tgtggtttaa ttcgaagcta cgcgaagaac cttaccaggt cttgacatct tgcgctaacc    1020
ttagagataa ggcgttccct cggggacgc aatgacaggt ggtgcatggt cgtcgtcagc    1080
tcgtgtcgtg agatgttggg ttaagtcccg caacgagcgc aacccttgtt actagttgcc    1140
agcattgagt tgggcactct agtgagactg ccggtgacaa accggaggaa ggtggggacg    1200
acgtcagatc atcatgcccc ttatgacctg ggctacacac gtgctacaat ggacggtaca    1260
acgagtcgca aactcgcgag agtaagctaa tctcttaaag ccgttctcag ttcggactgt    1320
aggctgcaac tcgcctacac gaagtcggaa tcgctagtaa tcgcggatca gcatgccgcg    1380
gtgaatacgt tcccgggcct tgtacacacc gcccgtcaca ccatgggagt ttgtaacgcc    1440
caaagtcggt ggcctaacct ttatggaggg agccgcctaa ggcgggacag atgactgggg    1500
tgaagtcgta acaggaaacc ccg                                            1523
```

<210> SEQ ID NO 2

```
<211> LENGTH: 1440
<212> TYPE: DNA
<213> ORGANISM: Unknown
<220> FEATURE:
<223> OTHER INFORMATION: Lactobacillus casei

<400> SEQUENCE: 2
tgcagtcgaa cgagttctcg ttgatgatcg gtgcttgcac cgagattcaa catggaacga      60
gtggcggacg ggtgagtaac acgtgggtaa cctgcccctta agtggggggat aacatttgga    120
aacagatgct aataccgcat agatccaaga accgcatggt tcttggctga agatggcgt       180
aagctatcgc ttttggatgg acccgcggcg tattagctag ttggtgaggt aatggctcac     240
caaggcgatg atacgtagcc gaactgagag gttgatcggc cacattggga ctgagacacg     300
gcccaaactc ctacgggagg cagcagtagg gaatcttcca caatggacgc aagtctgatg    360
gagcaacgcc gcgtgagtga agaaggcttt cgggtcgtaa aactctgttg ttggagaaga    420
atggtcggca gagtaactgt tgtcggcgtg acggtatcca accagaaagc cacggctaac     480
tacgtgccag cagccgcggt aatacgtagg tggcaagcgt tatccggatt tattgggcgt     540
aaagcgagcg caggcggttt tttaagtctg atgtgaaagc cctcggctta accgaggaag    600
cgcatcggaa actgggaaac ttgagtgcag aagaggacag tggaactcca tgtgtagcgg    660
tgaaatgcgt agatatatgg aagaacacca gtggcgaagg cggctgtctg gtctgtaact    720
gacgctgagg ctcgaaagca tgggtagcga acaggattag ataccctggt agtccatgcc    780
gtaaacgatg aatgctaggt gttggagggt ttccgccctt cagtgccgca gctaacgcat    840
taagcattcc gcctggggag tacgaccgca aggttgaaac tcaaaggaat tgacggggggc   900
ccgcacaagc ggtggagcat gtggtttaat tcgaagcaac gcgaagaacc ttaccaggtc    960
ttgacatctt ttgatcacct gagagatcag gtttcccctt cggggggcaaa atgacaggtg  1020
gtgcatggtt gtcgtcagct cgtgtcgtga tgttgggt taagtcccgc aacgagcgca    1080
acccttatga ctagttgcca gcatttagtt gggcactcta gtaagactgc cggtgacaaa   1140
ccggaggaag gtggggatga cgtcaaatca tcatgcccct tatgacctgg gctacacacg   1200
tgctacaatg gatggtacaa cgagttgcga gaccgcgagg tcaagctaat ctcttaaagc   1260
cattctcagt tcggactgta ggctgcaact cgcctacacg aagtcggaat cgctagtaat   1320
cgcggatcag cacgccgcgg tgaatacgtt cccgggcctt gtacacaccg cccgtcacac   1380
catgagagtt tgtaacaccc gaagccggtg gcgtaaccct tttagggagc gagccgtcta  1440

<210> SEQ ID NO 3
<211> LENGTH: 1438
<212> TYPE: DNA
<213> ORGANISM: Unknown
<220> FEATURE:
<223> OTHER INFORMATION: Lactobacillus reuteri

<400> SEQUENCE: 3
caagtcgtac gcactggccc aactgattga tggtgcttgc acctgattga cgatggatca      60
ccagtgagtg gcggacgggt gagtaacacg taggtaacct gccccggagc ggggataac     120
atttggaaac agatgctaat accgcataac aacaaaagcc acatggcttt tgtttgaaag    180
atggctttgg ctatcactct gggatggacc tgcggtgcat tagctagttg gtaaggtaac    240
ggcttaccaa ggcgatgatg catagccgag ttgagagact gatcggccac aatggaactg    300
agacacggtc catactccta cgggaggcag cagtagggaa tcttccacaa tgggcgcaag    360
cctgatggag caacaccgcg tgagtgaaga agggtttcgg ctcgtaaagc tctgttgttg   420
```

```
gagaagaacg tgcgtgagag taactgttca cgcagtgacg gtatccaacc agaaagtcac    480
ggctaactac gtgccagcag ccgcggtaat acgtaggtgg caagcgttat ccggatttat    540
tgggcgtaaa gcgagcgcag gcggttgctt aggtctgatg tgaaagcttt cggcttaacc    600
gaagaagtgc atcggaaacc gggcgacttg agtgcagaag aggacagtgg aactccatgt    660
gtagcggtgg aatgcgtaga tatatggaag aacaccagtg gcgaaggcgg ctgtctggtc    720
tgcaactgac gctgaggctc gaaagcatgg gtagcgaaca ggattagata ccctggtagt    780
ccatgccgta aacgatgagt gctaggtgtt ggagggtttc cgcccttcag tgccggagct    840
aacgcattaa gcactccgcc tggggagtac gaccgcaagg ttgaaactca aaggaattga    900
cgggggcccg cacaagcggt ggagcatgtg gtttaattcg aagctacgcg aagaaccttta   960 ccaggtcttg acatcttgcg ctaaccttag agataaggcg ttcccttcgg ggacgcaatg   1020
acaggtggtg catggtcgtc gtcagctcgt gtcgtgagat gttgggttaa gtcccgcaac   1080
gagcgcaacc cttgttacta gttgccagca ttaagttggg cactctagtg agactgccgg   1140
tgacaaaccg gaggaaggtg gggacgacgt cagatcatca tgccccttat gacctgggct   1200
acacacgtgc tacaatggac ggtacaacga gtcgcaagct cgcgagagta agctaatctc   1260
ttaaagccgt tctcagttcg gactgtaggc tgcaactcgc ctacacgaag tcggaatcgc   1320
tagtaatcgc ggatcagcat gccgcggtga atacgttccc gggccttgta cacaccgccc   1380
gtcacaccat gggagtttgt aacgcccaaa gtcggtggcc taacctttat ggaggagc    1438
```